United States Patent
Sugihara

(10) Patent No.: US 9,020,661 B2
(45) Date of Patent: Apr. 28, 2015

(54) VEHICLE CONTROLLER

(75) Inventor: Kenji Sugihara, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/000,756

(22) PCT Filed: Mar. 27, 2012

(86) PCT No.: PCT/JP2012/002105
§ 371 (c)(1),
(2), (4) Date: Aug. 21, 2013

(87) PCT Pub. No.: WO2012/132401
PCT Pub. Date: Oct. 4, 2012

(65) Prior Publication Data
US 2014/0012435 A1    Jan. 9, 2014

(30) Foreign Application Priority Data

Mar. 29, 2011   (JP) .................................. 2011-072054

(51) Int. Cl.
| | |
|---|---|
| *G06F 17/00* | (2006.01) |
| *B60W 50/00* | (2006.01) |
| *B60L 3/00* | (2006.01) |
| *B60L 3/12* | (2006.01) |
| *F02D 41/24* | (2006.01) |
| *F02D 41/22* | (2006.01) |

(52) U.S. Cl.
CPC ........... *G06F 17/00* (2013.01); *B60W 50/0098* (2013.01); *B60W 2050/0073* (2013.01); *B60W 2050/0077* (2013.01); *F02D 2041/227* (2013.01); *B60L 3/0084* (2013.01); *B60L 3/12* (2013.01); *Y02T 90/16* (2013.01); *F02D 41/2493* (2013.01); *Y02T 10/7258* (2013.01)

(58) Field of Classification Search
CPC combination set(s) only.
See application file for complete search history.

(56) References Cited

U.S. PATENT DOCUMENTS

| | | | |
|---|---|---|---|
| 6,198,996 B1 * | 3/2001 | Berstis | ............................ 701/36 |
| 7,415,339 B2 * | 8/2008 | Ikeda et al. | ..................... 701/49 |

(Continued)

FOREIGN PATENT DOCUMENTS

| | | |
|---|---|---|
| JP | 09-282599 A | 10/1997 |
| JP | 10-021495 A | 1/1998 |

(Continued)

OTHER PUBLICATIONS

International Search Report for PCT/JP2012/002105 dated Jul. 3, 2012.

*Primary Examiner* — John R Olszewski
*Assistant Examiner* — James M McPherson
(74) *Attorney, Agent, or Firm* — Pearne & Gordon LLP

(57) ABSTRACT

According to a vehicle controller, when a communication control unlit (13) of a vehicle controller (1) acquires a variable control parameter from a server (5) via the Internet (4), the variable control parameter is stored in a write-enabled storage unit (11), and the user can change to a desired vehicle driving state on the basis of the variable control parameter. A fixed control parameter set as a default value and adapted for initializing the vehicle driving state is stored in a non-write-enabled storage unit (12). If an emergency stop button (16) is pushed or a vehicle-information-acquiring unit (17) acquires driving error detection information when the vehicle is driving on the basis of the variable control parameter, the vehicle immediately switches to a safe driving state according to the fixed control parameter.

8 Claims, 5 Drawing Sheets

(56) References Cited

U.S. PATENT DOCUMENTS

| | | |
|---|---|---|
| 2004/0087414 A1* | 5/2004 | Markyvech .................. 477/90 |
| 2005/0068191 A1* | 3/2005 | Eschke et al. ........... 340/825.72 |
| 2006/0015221 A1* | 1/2006 | Sarkar et al. ................... 701/2 |
| 2007/0005196 A1* | 1/2007 | Oikawa et al. .................. 701/1 |
| 2007/0100513 A1* | 5/2007 | Asano ............................. 701/2 |
| 2007/0198145 A1* | 8/2007 | Norris et al. ................... 701/23 |
| 2007/0216222 A1* | 9/2007 | Miyazaki et al. ............. 303/155 |
| 2007/0219675 A1* | 9/2007 | Uchida et al. ................... 701/1 |
| 2007/0282558 A1* | 12/2007 | Sagisaka ...................... 702/116 |

FOREIGN PATENT DOCUMENTS

| | | |
|---|---|---|
| JP | 2000-113384 A | 4/2000 |
| JP | 2001-301485 A | 10/2001 |
| JP | 2003-077100 A | 3/2003 |
| JP | 2005-501778 A | 1/2005 |
| JP | 2006-347531 A | 12/2006 |
| JP | 2007-8421 A | 1/2007 |
| JP | 2007-245842 A | 9/2007 |
| JP | 2007-253861 A | 10/2007 |
| JP | 2009-073386 A | 4/2009 |

* cited by examiner

| | WRITABLE STORAGE SECTION | |
|---|---|---|
| STEERING WHEEL CONTROL SECTION | VARIABLE-CONTROL-PARAMETER STEERING WHEEL ANGLE AND TURNING ANGLE CORRESPONDENCE TABLE | 14a1 |
| BRAKE CONTROL SECTION | VARIABLE-CONTROL-PARAMETER BRAKE STEPPING AMOUNT AND BRAKING AMOUNT CORRESPONDENCE TABLE | 14b1 |
| | VARIABLE-CONTROL-PARAMETER ABS CONTROL TIMING INFORMATION | 14b2 |
| ACCELERATION CONTROL SECTION | VARIABLE-CONTROL-PARAMETER ACCELERATOR STEPPING AMOUNT AND MOTOR ROTATION AMOUNT CORRESPONDENCE TABLE | 14c1 |
| NAVIGATION APPARATUS | MAP INFORMATION | 15a1 |
| | SERVICE INFORMATION | 15a2 |

VEHICLE CONTROLLER

TECHNICAL FIELD

The present invention relates to a vehicle control apparatus configured to perform communication between an electronic control unit (ECU) installed in a vehicle and an external device via a communication network. More particularly, the invention relates to a vehicle control apparatus capable of varying control parameters of a vehicle based on information from the external device.

BACKGROUND ART

In recent years, along with increasing generalization of a hybrid electric vehicle (HEV) and an electric vehicle (EV), it has been made possible for these vehicles to allow an external device to control the vehicle control apparatus via a communication network. In addition, as a related art, there is disclosed a technique that performs remote diagnosis or remote maintenance or the like of a vehicle system by accessing vehicle function apparatuses (such as an engine control apparatus, a fuel supply apparatus, or brake control apparatus) from an external device via a communication network.

However, if a third party not directly related to the operation of a vehicle controls a vehicle control apparatus from an external device, such control may interfere with safe driving. Accordingly, it is necessary to allow only a person related to the operation of the vehicle to access the vehicle control apparatus. Patent Literature (PTL) 1 discloses a technique that provides a firewall to the input side of a vehicle control apparatus, and allows the person in charge of the vehicle to access the interface of the vehicle system from an external device and to perform remote diagnosis or remote maintenance only when this firewall validates the external input.

CITATION LIST

Patent Literature

PTL 1
Japanese Unexamined Patent Application Publication (Translation of PCT Application) No. 2005-501778

SUMMARY OF INVENTION

Technical Problem

However, the information inputted to the vehicle function apparatus from an external device via the firewall is not always necessarily information used for properly performing remote diagnosis or remote maintenance. Perhaps, even if such a firewall is provided to the input side of the abovementioned vehicle control apparatus, the information validated by the firewall and thus inputted to the vehicle control apparatus (e.g., control parameter) is not always necessarily a control parameter for safe driving. For example, when the driver of the vehicle inputs a wrong parameter or a control parameter above the safety driving standard, such a control parameter passes through the firewall and is inputted to the vehicle control apparatus. Accordingly, the operation control of the vehicle is performed based on an improper control parameter in this case. Thus, safe driving of the vehicle cannot be maintained.

It is an object of the present invention to provide a vehicle control apparatus that allows a vehicle to run safely even when a control parameter that has been inputted from an external device via a communication network has a problem.

Solution to Problem

For the purpose of achieving the abovementioned object, a vehicle control apparatus according to the present invention is a vehicle control apparatus to be installed in a vehicle and being capable of controlling a running state of the vehicle on a basis of information acquired from an external device via a communication network, the vehicle control apparatus including: a communication control section that acquires, via an external network, a variable control parameter capable of varying the running state of the vehicle; a writable storage section that accumulates the variable control parameter; a non-writable storage section that accumulates a fixed control parameter defined as a default value and used to initialize the running state of the vehicle; a vehicle information acquisition section that determines whether behavior of the vehicle is abnormal; and a safety-related section that makes the vehicle run on a basis of the variable control parameter when the variable control parameter is present, and that makes the vehicle run on a basis of the fixed control parameter when the variable control parameter is absent or when the vehicle information acquisition section detects that the behavior of the vehicle is abnormal.

Advantageous Effect of Invention

According to the present invention, upon detection of abnormality in the behavior (e.g., running state such as running, turning, and stopping) of a vehicle, the vehicle immediately switches to a running state using a fixed control parameter that has been defined as a default value, even while the vehicle runs on the basis of a variable control parameter that has been optionally set by the user. With this configuration, even when the user sets a variable control parameter by mistake, or a variable control parameter for the safety-related section has a problem, it is possible to make the vehicle run safely on the basis of a fixed control parameter defined as a default value.

BRIEF DESCRIPTION OF DRAWINGS

FIG. 2 is a diagram illustrating variable-control-parameter tables for parameters accumulated in a writable storage section illustrated in FIG. 1;

DESCRIPTION OF EMBODIMENT

Figure 1:
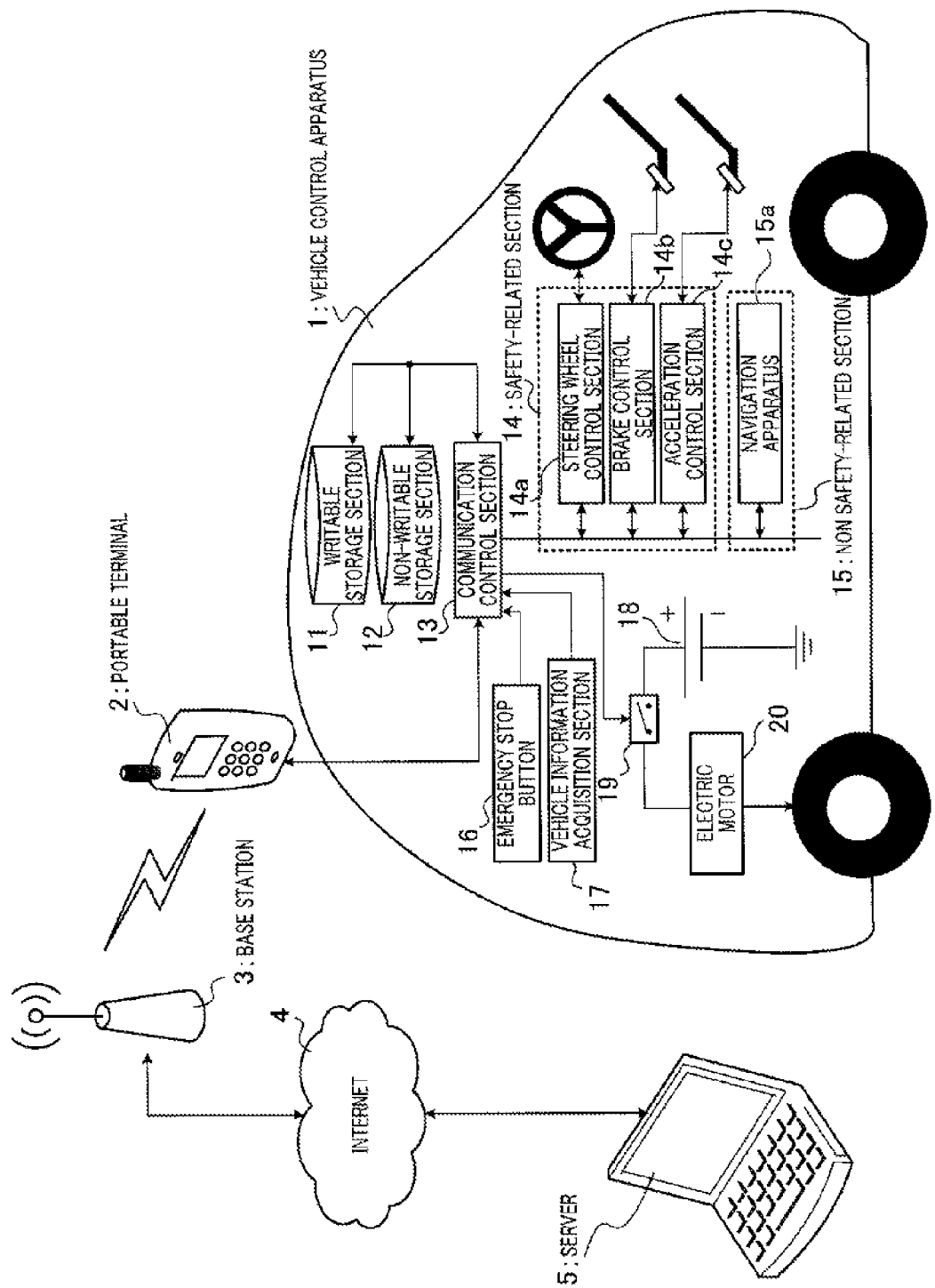
FIG. 1 is a configuration diagram of a system for realizing a vehicle control apparatus according to an embodiment of the present invention.

A vehicle control apparatus according to an embodiment of the present invention separates control parameters between fixed control parameters and variable control parameters in advance and accumulate the fixed control parameters in a non-writable storage section while accumulating the variable control parameters in a writable storage section. Moreover, control parameters transmitted from an external device via a communication network are accumulated in the writable storage section as variable control parameters. Upon detection of abnormal running while the vehicle runs on the basis of a variable control parameter, the vehicle control apparatus immediately switches the variable control parameter to a fixed control parameter. As a result, the operation control of the vehicle can be always performed based on a proper control parameter.

Note that, the fixed control parameters are control parameters created based on default values of the manufacturer. It is favorable to use, as the fixed control parameters, the parameters that have been verified as safe by the manufacturer of the vehicle. Meanwhile, examples of the variable control parameters include a parameter to be used for changing a control parameter after the sale of the vehicle.

Hereinafter, an embodiment of a vehicle control apparatus according to the present invention will be described in detail with reference to the drawings. Note that, throughout all the drawings for describing this embodiment, the same elements are assigned the same reference numerals as a general rule, and redundant descriptions of the elements are omitted as much as possible.

FIG. 1 is a configuration diagram of a system for realizing a vehicle control apparatus according to an embodiment of the present invention. As illustrated in FIG. 1, vehicle control apparatus 1 installed in a vehicle is communicably connected to base station 3 via mobile terminal 2 and is also communicably connected to server 5 such as a personal computer via the Internet denoted by reference numeral 4 from base station 3. Note that, vehicle control apparatus 1 and server 5 communicate with each other using general communication protocols.

In addition, although the system configuration diagram in FIG. 1 displays a means for performing communication by radio, the means used by vehicle control apparatus 1 to communicate with an external device may be any communication means regardless of wired/wireless means as long as the communication means is connected to an open network. Alternatively, a secured digital memory card (SD) card, which is a type of memory card, may be used for communication.

Vehicle control apparatus 1 mainly includes writable storage section 11, non-writable storage section 12, communication control section 13, safety-related section 14, non safety-related section 15, emergency stop button 16, vehicle information acquisition section 17, battery 18, switch 19 and electric motor 20. Safety-related section 14 includes steering wheel control section 14a brake control section 14b, and acceleration control section 14c. Non safety-related section 15 includes navigation apparatus 15a and the like.

Writable storage section 11 may be a random access memory (RAM) or a hard disk drive (HDD) as long as the RAM or HDD provides a region rewritable by communication control section 13. Moreover, writable storage section 11 may be a nonvolatile storage region in which data can be saved without power supply.

Non-writable storage section 12 is realized by a read only memory (ROM), or a RAM configured to be non-rewritable in vehicle control apparatus 1, for example.

Communication control section 13 is an interface for vehicle control apparatus 1 to communicate with server 5 or the like via mobile terminal 2 and has functions to receive data from server 5, which is an external device, and to transmit various types of data of vehicle control apparatus 1 to server 5.

Safety-related section 14 includes acceleration control section 14c that performs "running" operation, brake control section 14b that performs "stopping." operation, and steering wheel control section 14a that performs "turning" operation.

Non safety-related section 15 is a means that is not related to basic running operation including "running," "stopping," and "turning" and includes navigation apparatus 15a, an ETC, an audio system and the like. However, when the vehicle is provided with an automated driving system, navigation apparatus 15a is included in safety-related section 14. This is because the automated driving system allows the vehicle to run automatically by using functions included in navigation apparatus 15a such as route search and route guide or the like, so that navigation apparatus 15a serves as means that is related to the basic running operation including "running," "stopping," and "turning."

Vehicle information acquisition section 17 includes functions to acquire running information or other various types of information on the vehicle and to transmit the information to communication control section 13. The running information on the vehicle herein includes the running speed of the vehicle, the turning angle of the vehicle, and the acceleration of the vehicle, for example.

Battery 18 is a power supply for driving electric motor 20 and a power supply for vehicle control apparatus 1. Switch 19 is an opening and closing means for supplying and blocking power from battery 18 to electric motor 20.

Electric motor 20 is a means for driving wheels for running an EV, or HEV by the power from battery 18. Note that, although a DC-AC converter is omitted in vehicle control apparatus 1, electric motor 20 rotationally drives wheels by AC power obtained by converting the power from battery 18 into AC power by the DC-AC converter.

FIG. 2 is a diagram illustrating variable-control-parameter tables for parameters accumulated in writable storage section 11 illustrated in FIG. 1. More specifically, writable storage section 11 accumulates parameters of variable-control-parameter steering wheel angle and turning angle correspondence table 14a1 for steering wheel control section 14a. In addition, writable storage section 11 accumulates parameters of variable-control-parameter brake stepping amount and braking amount correspondence table 14b1 and ABS (Anti-Lock Brake System) control timing information 14b2 for brake control section 14b. In addition, writable storage section 11 accumulates parameters of variable-control-parameter accelerator stepping amount and motor rotation amount correspondence table 14c1 for acceleration control section 14c. Moreover, writable storage section 11 accumulates map information 15a1 and service information 15a2 as data for navigation apparatus 15a.

Variable control parameters are parameters used for changing control parameters after the vehicle is sold. There is a case where a control parameter of safety-related section 14 needs to be changed after the vehicle is sold. For example, in brake control section 14b, brake feeling (how the user feels the degree of braking when stepping on the brake pedal) is changed sometimes after the vehicle is sold. In this case, a variable control parameter is used to change the brake feeling. In steering wheel control section 14a and acceleration control section 14c as well, how the user feels steering wheel and acceleration control may need to be changed in some cases.

Figure 3:
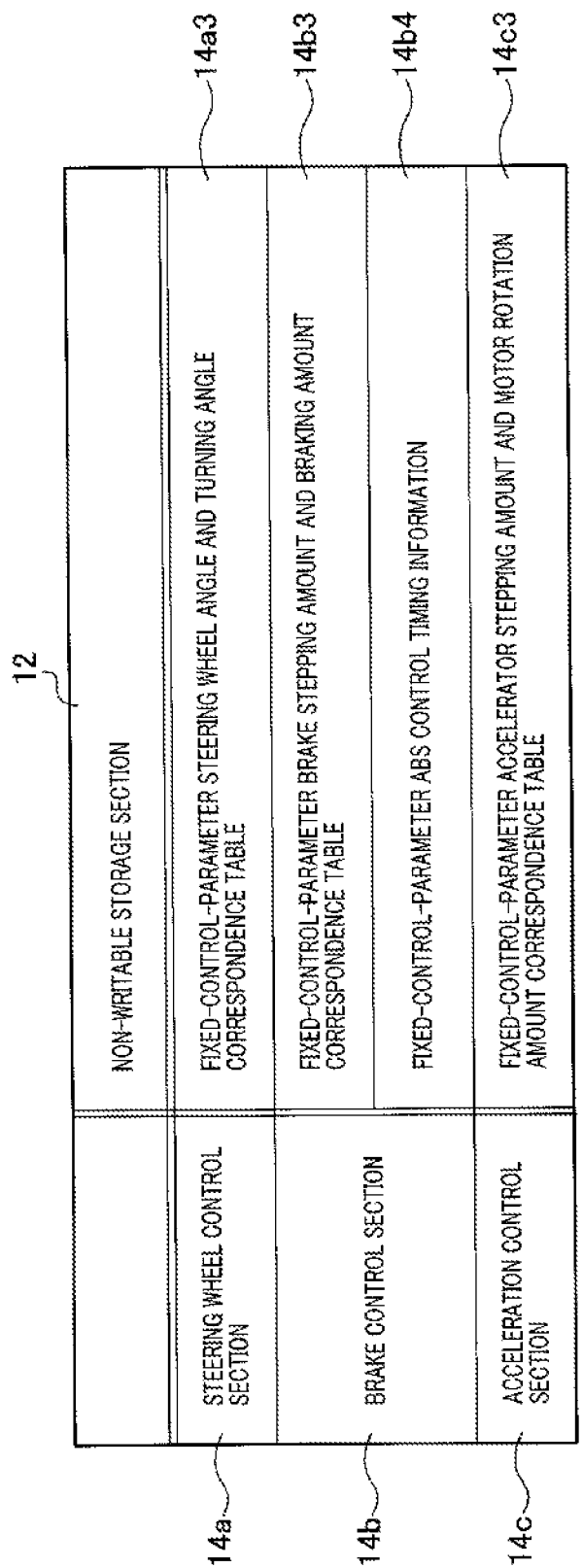
FIG. 3 is a diagram illustrating fixed-control-parameter tables for parameters accumulated in a non-writable storage section illustrated in FIG. 1.

FIG. 3 is a diagram illustrating fixed control parameter tables for parameters accumulated in non-writable storage section 12 illustrated in FIG. 1. Specifically, non-writable storage section 12 accumulates parameters of fixed-control-parameter steering wheel angle and turning angle correspondence table 14a3 for steering wheel control section 14a. Moreover, non-writable storage section 12 accumulates parameters of fixed-control-parameter brake stepping amount and braking amount correspondence table 14b3 and ABS control timing information 14b4 for brake control section 14b. Furthermore, non-writable storage section 12 accumulates parameters of fixed-control-parameter accelerator stepping amount and motor rotation amount correspondence table 14c3 for acceleration control section 14c.

Figure 4:
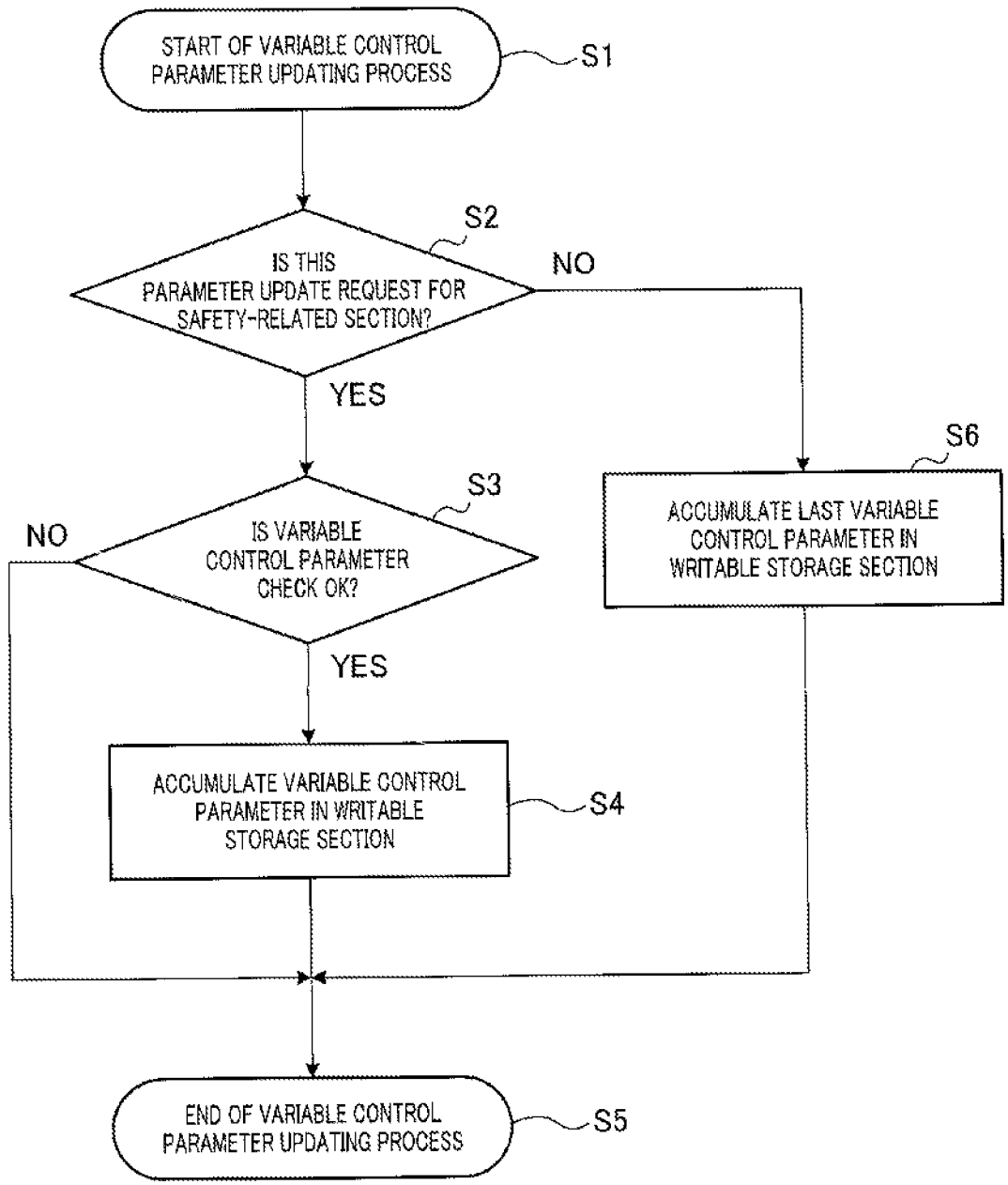
FIG. 4 is a flowchart illustrating a flow of processing performed when a vehicle control apparatus receives a variable control parameter from an external server.

Next, a description will be provided regarding a flow of processing performed when communication control section 13 of vehicle control apparatus 1 receives a variable control parameter requested by a user from server 5 on an open network of the outside of the vehicle. FIG. 4 is a flowchart indicating a flow of processing performed when vehicle control apparatus 1 receives a variable control parameter from server 5 located outside vehicle control apparatus 1.

In FIG. 4, upon reception of a variable control parameter request from server 5 located outside vehicle control apparatus 1 by communication control section 13 of vehicle control apparatus 1, vehicle control apparatus 1 starts a variable control parameter updating process (step S1). Vehicle control apparatus 1 determines whether or not the content of the request from server 5 is a request to update a variable control parameter for safety related section 14 (step S2). If the request is to update a variable control parameter for safety related section 14 (YES in step S2), vehicle control apparatus 1 determines whether or not the result of checking the variable control parameter is OK (step S3). Note that the content of checking a variable control parameter is to check the presence of viruses and obvious errors such as an error the variable control parameter requested from server 5 exceeds a predetermined value, for example. Examples of the obvious error that the requested variable control parameter exceeds a predetermined value are as follows: an extremely large turning angle is set with respect to a steering wheel turning amount; a too large motor rotation amount of electric motor 20 is set with respect to the amount of stepping on an accelerator pedal; and a too large braking amount is set with respect to the amount of stepping on a brake pedal.

In step S3, if the result of checking the variable control parameter is OK (YES in step S3), the variable control parameter to which an update request has been made is accumulated in writable storage section 11 of vehicle control apparatus 1 (step S4). Upon execution of an updating process for the variable control parameter, vehicle control apparatus 1 ends a series of updating processing operations (step S5).

In step S2, if the content of the request from server 5 is not a request to update a variable control parameter for safety related section 14 (NO in step S2), vehicle control apparatus 1 accumulates the last variable control parameter in writable storage section 11 (step S6) and ends a series of updating processing operations (step S5). Furthermore, if the result of checking the variable control parameter is not OK in step S3 (NO in step S3), vehicle control apparatus 1 ends the updating process for the variable control parameter (step S5).

Figure 5:
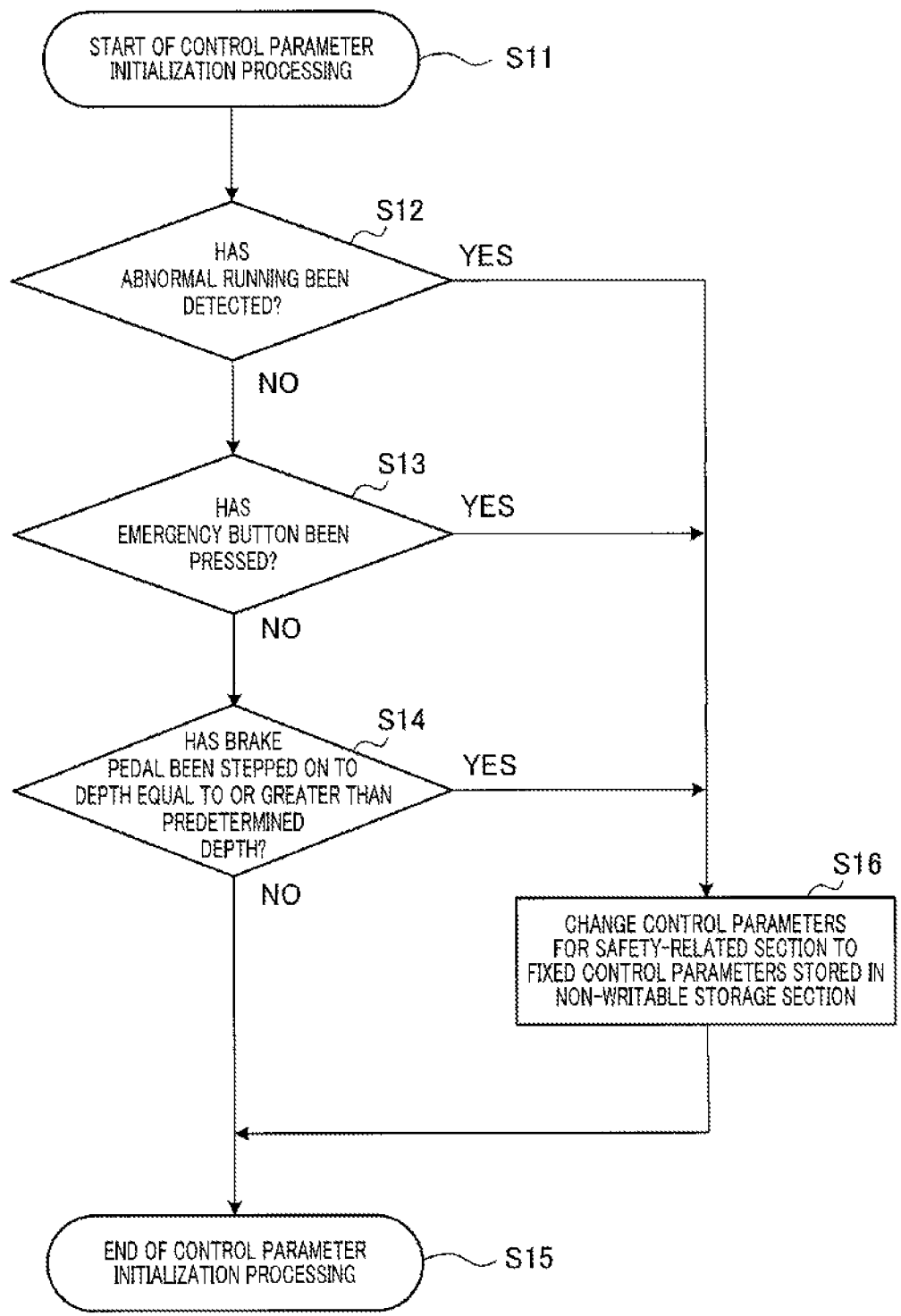
FIG. 5 is a flowchart illustrating a flow of processing performed when a vehicle runs on the basis of a variable control parameter of a writable storage section of the vehicle control apparatus illustrated in FIG. 1.

FIG. 5 is a flowchart illustrating a flow of control parameter initialization processing performed when the vehicle runs on the basis of a variable control parameter in writable storage section 11 of vehicle control apparatus 1 illustrated in FIG. 1. When a variable control parameter is stored, the vehicle runs using the variable control parameter. In FIG. 5, when the vehicle starts running using a variable control parameter in writable storage section 11 (step S11), whether or not abnormal running occurs is determined at a predetermined timing (step S12). Note that, although whether or not the result of checking the variable control parameter is OK is also determined in step S3 of the variable control parameter updating process illustrated in FIG. 4, there may be a case where abnormality occurs when the variable control parameter is actually applied to the vehicle control even if the result of checking is determined to be OK. For this reason, even when the result of step S3 is OK, it is significant to determine whether or not abnormality running occurs by detecting the content of the behavior of the vehicle as in step S12.

Note that, as to the contents of abnormal running to be detected, vehicle information acquisition section 17 detects the content of the behavior of the running vehicle and determines whether or not abnormal running occurs. Specifically, vehicle information acquisition section 17 detects abnormal running in the following cases: (1) for the behavior "running" performed by acceleration control section 14c, when the acceleration with respect to the amount of stepping on the accelerator pedal is equal to or greater than a predetermined amount; (2) for the behavior "stopping" performed by brake control section 14b, when the deceleration amount with respect to the brake pedal stepping amount is smaller than a predetermined value; and (3) for the behavior "turning" performed by steering wheel control section 14a, when the turning angle of the vehicle with respect to the turning angle of the steering wheel is smaller than a predetermined value.

Referring back to FIG. 5, when no abnormal running is detected on the vehicle running on the basis of the changed variable control parameter in step S12 (NO in step S12), whether or not emergency stop button 16 has been pressed is determined (step S13). If emergency stop button 16 has not been pressed (NO in step S13), whether or not the brake pedal has been stepped on to a depth greater than a predetermined depth is determined (step S14).

When it is determined that the brake pedal has not been stepped on to a depth equal to or greater than a predetermined depth in step S14 (NO in step S14), the running state based on the variable control parameter after the change based on a request from server 5 is normal. Accordingly, vehicle control apparatus 1 ends the changing process for each of the variable control parameters of safety-related section 14 (i.e., variable control parameter 14a1 of steering wheel control section 14a, variable control parameter 14b1 of brake control section 14b, and variable control parameter 14c1 of acceleration control section 14c) (step S15).

Meanwhile, when at least one of the following three cases is true, vehicle control apparatus 1 changes the variable control parameters of safety-related section 14 to the respective fixed control parameters stored in non-writable storage section 12 (step S16) and ends the control parameter initialization processing (step S15). One of the three cases is when abnormal running on a vehicle running on the basis of the variable control parameter after the change in step S12 is detected (YES in step S12). Another case is when emergency stop button 16 has been pressed in step S13 (YES in step S13). Moreover, the last case is when the brake pedal has been stepped on to a depth equal to or greater than a predetermined depth (YES in step S14). The respective fixed control parameters described above are fixed control parameter 14a3 of steering wheel control section 14a, fixed control parameter 14b3 of brake control section 14b, and fixed control parameter 14c3 of acceleration control section 14c.

Note that, in a case where the variable control parameter updating process illustrated in FIG. 4 is performed while the vehicle runs, it is determined whether or not vehicle control apparatus 1 is connected to the network. If vehicle control apparatus 1 is connected to the network, vehicle control apparatus 1 forcibly ends the variable control parameter updating process by disconnecting the network to block communication from server 5.

Although the embodiment of the present invention has been described above, the present invention is by no means limited to this embodiment and can be modified in various ways within a range not departing from the gist of the invention. For example, in a vehicle provided with an automated driving system, navigation apparatus 15a may be included in safety-related section 14, and navigation information may be requested to vehicle control apparatus 1 from server 5 as a variable control parameter. In this case as well, upon detection of abnormal running, safe driving of the vehicle can be maintained by changing the navigation information requested from server 5 by a user to a fixed control parameter according to the flow of the flowchart illustrated in FIG. 5.

The disclosure of the specification, the drawing, and the abstract of Japanese Patent Application No 2011-072054, filed on Mar. 29, 2011, is incorporated herein by reference in its entirety.

INDUSTRIAL APPLICABILITY

The vehicle control apparatus according to the present invention can be effectively used not only in a safe driving system for an HEV or EV, but also in a safe driving system for an ordinary vehicle such as a gasoline-fueled vehicle, for example.

REFERENCE SIGNS LIST

1 Vehicle control apparatus
2 Portable terminal
3 Base station
4 Internet
5 Server
11 Writable storage section
12 Non-writable storage section
13 Communication control section
14 Safety-related section
14a Steering wheel control section
14b Brake control section.
14c Acceleration control section
14a1 Variable-control-parameter steering wheel angle and turning angle correspondence table
14a3 Fixed-control-parameter steering wheel angle and turning angle correspondence table
14b1 Variable-control-parameter brake stepping amount and braking amount correspondence table
14b2 Variable-control-parameter ABS control timing information
14b3 Fixed-control-parameter brake stepping amount and braking amount correspondence table
14b4 Fixed-control-parameter ABS control timing information
14c1 Variable-control-parameter accelerator stepping amount and motor rotation amount correspondence table
14c3 Fixed-control-parameter accelerator stepping amount and motor rotation amount correspondence table
15 Non safety-related section.
15a Navigation apparatus
15a1 Map information
15a2 Service information
16 Emergency stop button
17 Vehicle information acquisition section
18 Battery
19 Switch
20 Electric motor

The invention claimed is:

1. A vehicle control apparatus to be installed in a vehicle and being configured for controlling a running state of the vehicle on a basis of information acquired from an external device via a communication network, the vehicle control apparatus comprising:
 a communication control section that acquires, via an external network, a variable control parameter configured for varying the running state of the vehicle;
 a writable storage section that accumulates the variable control parameter;
 a non-writable storage section that accumulates a fixed control parameter defined as a default value and used to initialize the running state of the vehicle;
 a vehicle information acquisition section that acquires information related to the running state of the vehicle and determines whether running, turning, or stopping behavior of the vehicle is abnormal while the vehicle runs on the basis of the variable control parameter; and
 a safety-related section that makes the vehicle run on a basis of the variable control parameter when the variable control parameter is present, and that makes the vehicle run on a basis of the fixed control parameter when the variable control parameter is absent, and that switches from the variable control parameter to the fixed control parameter when the vehicle information acquisition section detects that the running, turning, or stopping behavior of the vehicle is abnormal while the vehicle runs on the basis of the variable control parameter.

2. The vehicle control apparatus according to claim 1, wherein the running state to be controlled by the safety-related section corresponds to at least one of acceleration control, brake control, and steering wheel control.

3. The vehicle control apparatus according to claim 1, wherein the safety-related section forcibly changes the variable control parameter to the fixed control parameter when an emergency stop button installed in the vehicle is pressed, or when a brake pedal is stepped on by an amount equal to or greater than a predetermined value.

4. The vehicle control apparatus according to claim 1, wherein the vehicle information acquisition section determines that the behavior of the vehicle is abnormal when acceleration with respect to the amount of stepping on an acceleration pedal is equal to or greater than a predetermined value while the vehicle runs on a basis of the variable control parameter.

5. The vehicle control apparatus according to claim 1, wherein the vehicle information acquisition section determines that the behavior of the vehicle is abnormal when the amount of deceleration with respect to the amount of stepping on a brake pedal is smaller than a predetermined value while the vehicle runs on a basis of the variable control parameter.

6. The vehicle control apparatus according to claim 1, wherein the vehicle information acquisition section determines that the behavior of the vehicle is abnormal when a turning angle of the vehicle with respect to a turning angle of a steering wheel is smaller than a predetermined value while the vehicle runs on a basis of the variable Control parameter.

7. The vehicle control apparatus according to claim 1, wherein the vehicle information acquisition section forcibly blocks the communication network if the communication control section is connected to the communication network when the vehicle information acquisition section detects that the behavior of the vehicle is abnormal.

8. The vehicle control apparatus according to claim 1, wherein the vehicle control apparatus is installed in a hybrid electric vehicle or an electric vehicle.

* * * * *